United States Patent
Miyoshi (10) Patent No.: US 11,366,459 B2
(45) Date of Patent: Jun. 21, 2022

(54) PROGRAM SIMULATION SYSTEM FOR INDUSTRIAL MACHINES AND NUMERICAL CONTROL SYSTEM

(71) Applicant: FANUC CORPORATION, Yamanashi (JP)

(72) Inventor: Takashi Miyoshi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 7 days.

(21) Appl. No.: 16/993,830

(22) Filed: Aug. 14, 2020

(65) Prior Publication Data

US 2021/0064014 A1    Mar. 4, 2021

(30) Foreign Application Priority Data

Aug. 29, 2019  (JP) .............................. JP2019-156769

(51) Int. Cl.
  *G05B 19/418*  (2006.01)
  *G06F 21/57*  (2013.01)
(52) U.S. Cl.
  CPC . *G05B 19/41885* (2013.01); *G05B 19/41815* (2013.01); *G05B 19/41865* (2013.01); *G06F 21/57* (2013.01)
(58) Field of Classification Search
  None
  See application file for complete search history.

(56) References Cited

U.S. PATENT DOCUMENTS

2018/0349134 A1* 12/2018 Studer .................. G06F 8/71

FOREIGN PATENT DOCUMENTS

JP          H10207523 A     8/1998

* cited by examiner

*Primary Examiner* — Carlos R Ortiz Rodriguez
(74) *Attorney, Agent, or Firm* — Studebaker & Brackett PC (57) ABSTRACT

To provide a program simulation system and a numerical control system that do not require a simulation on a machine operator's side and can mitigate or reduce a burden on the machine operator's side. A program simulation system for industrial machines that performs a simulation according to a program includes a machine selection unit that selects at least one industrial machine to be simulated; an identification data group creation unit that has a function to automatically add an identification code for specifying the industrial machine to the program after simulating a program for the industrial machine selected by the machine selection unit and create a data group of the program and the identification code; and a determination unit that determines whether the identification code in the data group sent to an industrial machine side matches an identification code of the industrial machine itself.

5 Claims, 6 Drawing Sheets

PROGRAM SIMULATION SYSTEM FOR INDUSTRIAL MACHINES AND NUMERICAL CONTROL SYSTEM

This application is based on and claims the benefit of priority from Japanese Patent Application No. 2019-156769, filed on 29 Aug. 2019, the content of which is incorporated herein by reference.

BACKGROUND OF THE INVENTION

Field of the Invention

The present invention relates to a program simulation system for industrial machines and a numerical control system including the same.

Related Art

As is well known, in the field of machining operation, for example, computerized numerical control (CNC) technology is applied to numerically control the moving amounts, moving speeds, and the like of tools by a computer, so that the repetition of the same machining procedure, the machining of complicated shapes, and the like are highly automated.

In addition, design and drawing are performed by computer aided design (CAD), an operation program (e.g., machining program) according to the CAD data is created by computer aided manufacturing (CAM), and the data created by the CAM is taken into CNC. For example, various data such as options, parameters, NC programs, macro programs, macro variables, workpiece origin offsets, tool offsets, tool shape data, and tool management data are inputted and controlled, thereby automating NC machine tools and the like consistently from design to manufacturing.

Figure 6:
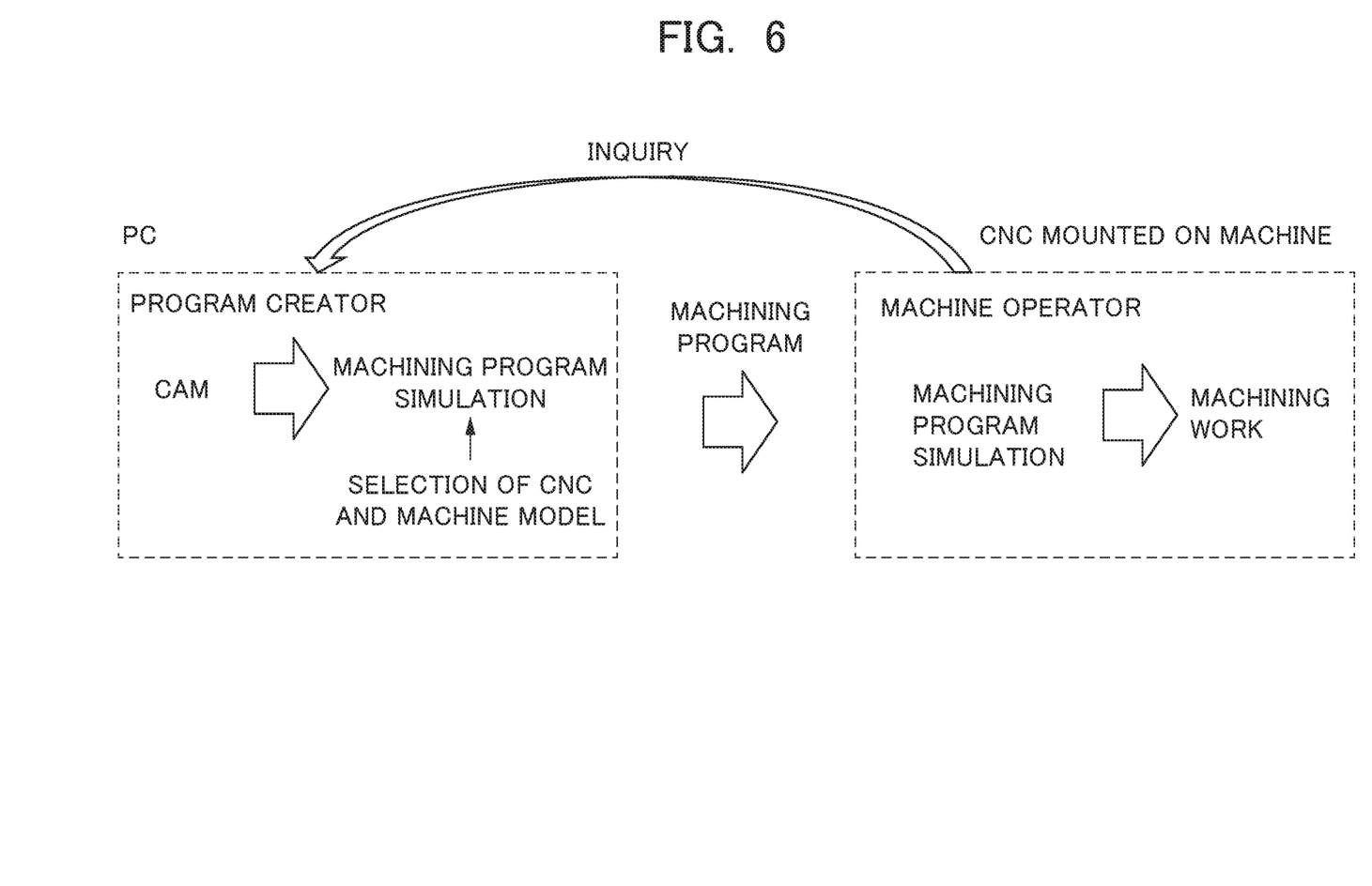
FIG. 6 is a diagram used to explain a control method by a conventional numerical control system and program simulation system for industrial machines.

On the other hand, as shown in FIG. 6, the program creator selects a CNC and machine model on the PC side (on the PC) and performs a simulation using a program created by CAM. The machine operator takes the program created by the program creator into the CNC, and performs a simulation on the machine side (on the CNC mounted on the machine) to confirm that the program is appropriate prior to execution on an actual machine.

Incidentally, Patent Document 1 discloses the following: An automatic programming apparatus for creating a program to control an NC machine, comprising: a material shape defining section for defining the material shape represented by a three-dimensional solid model; a machining unit preparing section for preparing plural machining units with unified information of a machining area represented by a three-dimensional solid model and a machining attribute inclusive of a machining method and tool information for machining the machining area; a machining unit defining section for selecting a designated machining unit from the machining units prepared by said machining unit preparing section and designating the arrangement and size of the machining area of the selected machining unit for the material shape defined by said material shaped defining section thereby to define the machining units for processing; a machined shape material creating section for removing the machining area shape of the machining unit defined by the said machining unit defining section from the material shape defined by said material shape defining section through Boolean operation, thereby creating the machined shape; a machining order setting section for setting a machining order for the machining units defined by said machining unit defining section; and an NC data creating section for creating NC data on the basis of the machining unit with the order set by said machining order setting section.

Patent Document 1: Japanese Unexamined Patent Application, Publication No. H10-207523

SUMMARY OF THE INVENTION

Here, in recent years, the simulation accuracy has been improved with a simulation model on a PC side, and it has become possible to perform simulations that are as close to reality as possible by using the simulation model on the PC side.

In addition, by reading a model close to the reality of the CNC system and the machine and performing a simulation based on acquired information close to the reality, it has become possible to reproduce accurate operation and perform a simulation close to the reality.

For this reason, a simulation on a machine side is often used to confirm that a wrong program will not be used simply as a precaution.

That is, as a factor for machine operators to use wrong machining programs, there is a case where a program creator performs a simulation using a wrong CNC model or machine model, and in particular, when many types of machines are possessed, the number of models will increase according to the number of types of machines, so that errors will occur more frequently.

In some cases, a machine operator misunderstands the application of a program created by a program creator, resulting in a mistake.

Therefore, assuming such a case of using a wrong program, misunderstanding the application of a program, or the like, a simulation on the machine side is often performed as a precaution.

However, the execution of a simulation on a machine by a machine operator requires a great deal of labor and effort. In some cases, it is not easy to determine whether a correct program is executed only with the result of a simulation, and in this case, as shown in FIG. 6, the machine operator needs to make inquiries to the program creator, and the machine operator needs considerable technical expertise.

For this reason, there has been a strong demand for a method and means that do not require a simulation on a machine operator's side and can mitigate or reduce a burden on the machine operator's side.

One aspect of the program simulation system for industrial machines of the present disclosure is a program simulation system for industrial machines that performs a simulation according to a program. The program simulation system includes: a machine selection unit that selects at least one industrial machine to be simulated; an identification data group creation unit that has a function to automatically add an identification code for specifying the industrial machine to the program after simulating a program for the industrial machine selected by the machine selection unit and create a data group of the program and the identification code; and a determination unit that determines whether the identification code in the data group sent to an industrial machine side matches an identification code of the industrial machine itself.

One aspect of the numerical control system of the present disclosure includes the above-described program simulation system and an industrial machine equipped with a numerical controller, and controls the operation of the industrial machine according to a determination result of the determination unit.

According to one aspect of the program simulation system for industrial machines and the numerical control system of the present disclosure, it is possible to prevent human error whereby a machine operator executes a program verified with a wrong model on a machine.

It is possible to eliminate the need for re-simulation by a machine operator, which is conventionally required, and it is possible to significantly mitigate the work burden of the machine operator.

It is not necessary to provide a simulation function on a machine side, and it is possible to reduce costs.

DETAILED DESCRIPTION OF THE INVENTION

The following describes a program simulation system for industrial machines and a numerical control system according to an embodiment with reference to FIGS. 1 to 5.

Here, the program simulation system for industrial machines and the numerical control system according to the present embodiment are a system for simulating the operation of industrial machines and a system for controlling the operation thereof in accordance with a program. Examples of industrial machines include machine tools, presses, press fitting machines, die casting machines, injection molding machines, cutting machines, robots, conveyors, measuring instruments, testing devices, printing machines, food machines, packaging machines, welding machines, washing machines, coating machines, assembling machines, mounting machines, woodworking machines, sealing machines, and other industrial machines whose operation can be controlled by numerical control.

In the present embodiment, it is assumed that the industrial machine is a machine tool.

Figure 1:
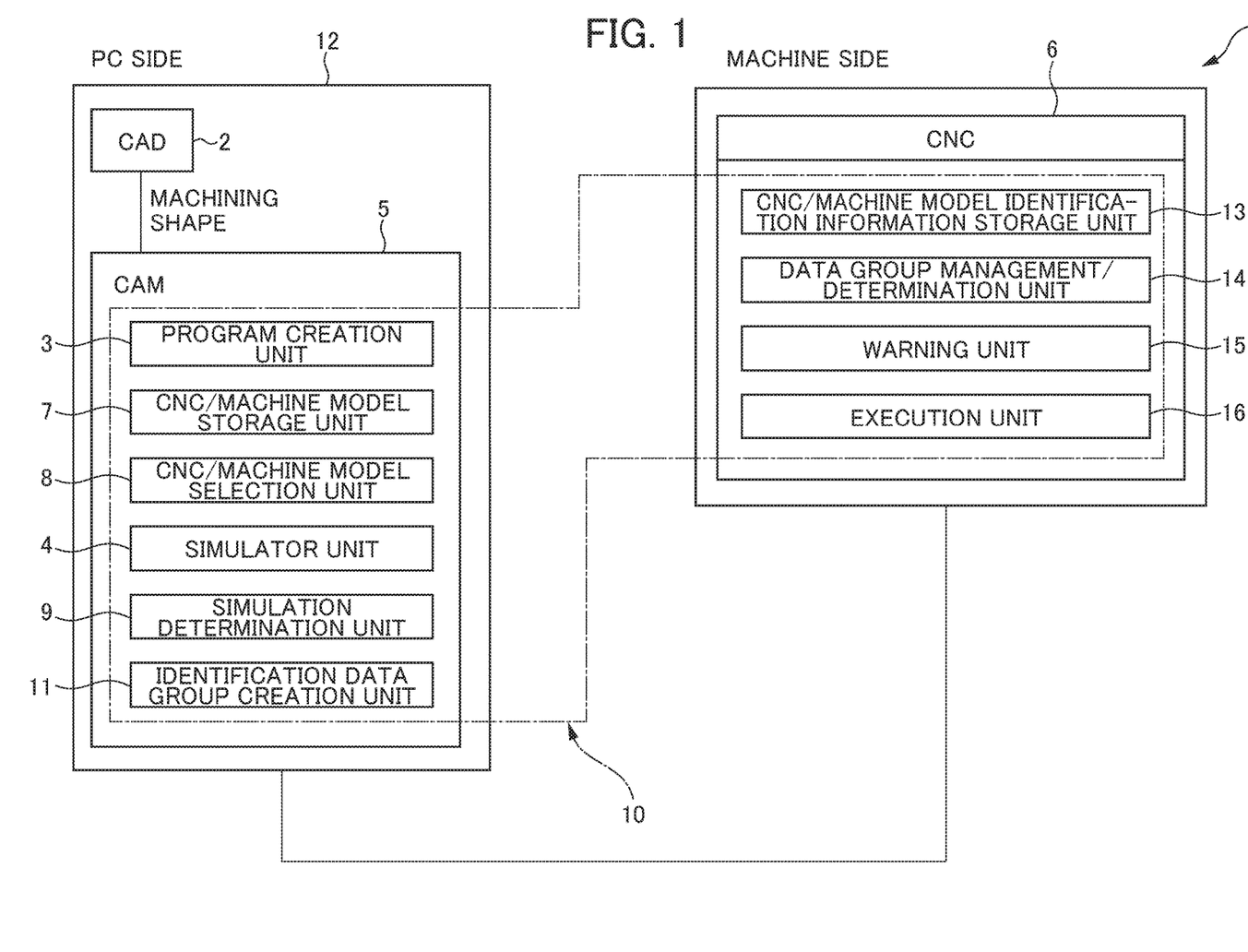
FIG. 1 is a block diagram showing a numerical control system and a program simulation system for industrial machines according to an aspect.
Figure 2:
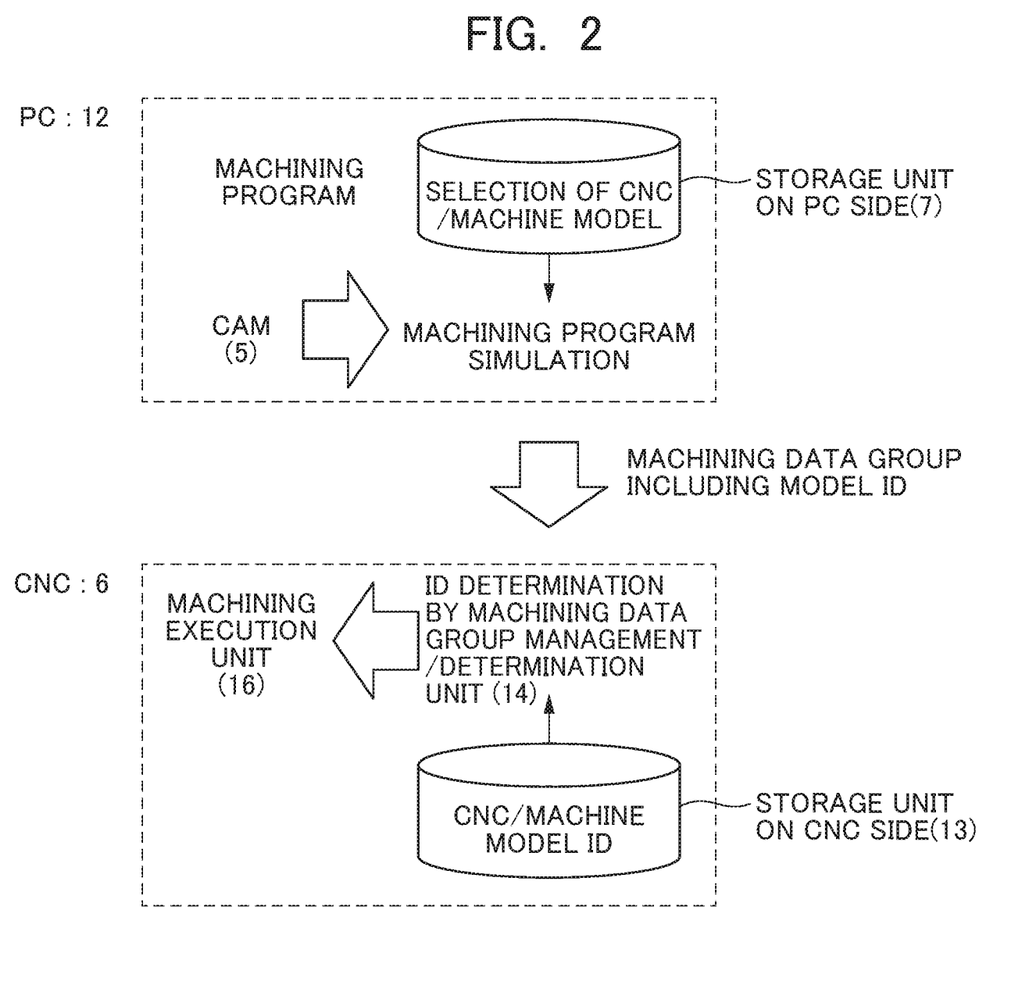
FIG. 2 is a diagram used to explain a control method by a numerical control system and a program simulation system for industrial machines according to an aspect.
Figure 3:
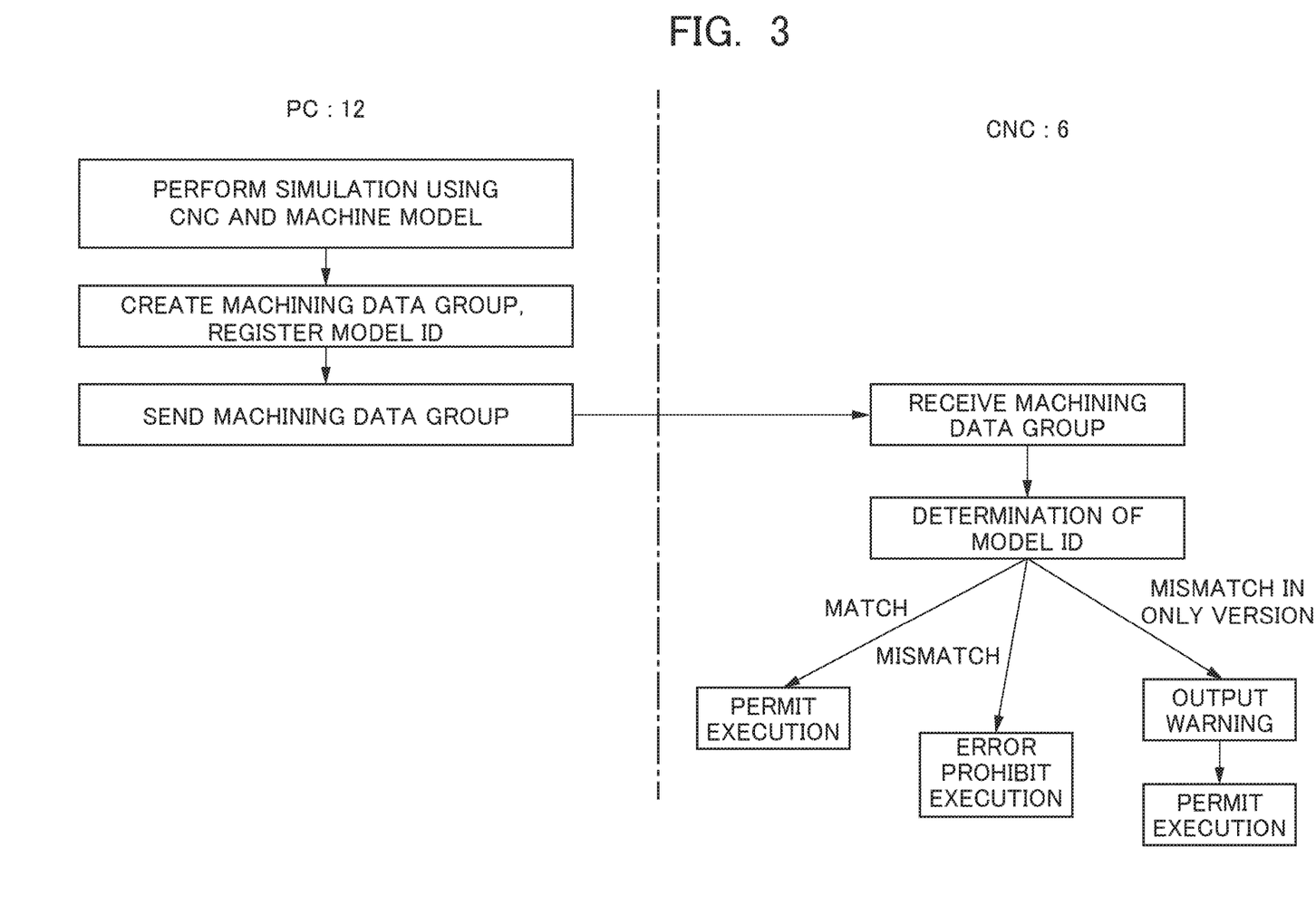
FIG. 3 is a diagram used to explain a control method by a numerical control system and a program simulation system for industrial machines according to an aspect.
Figure 4:
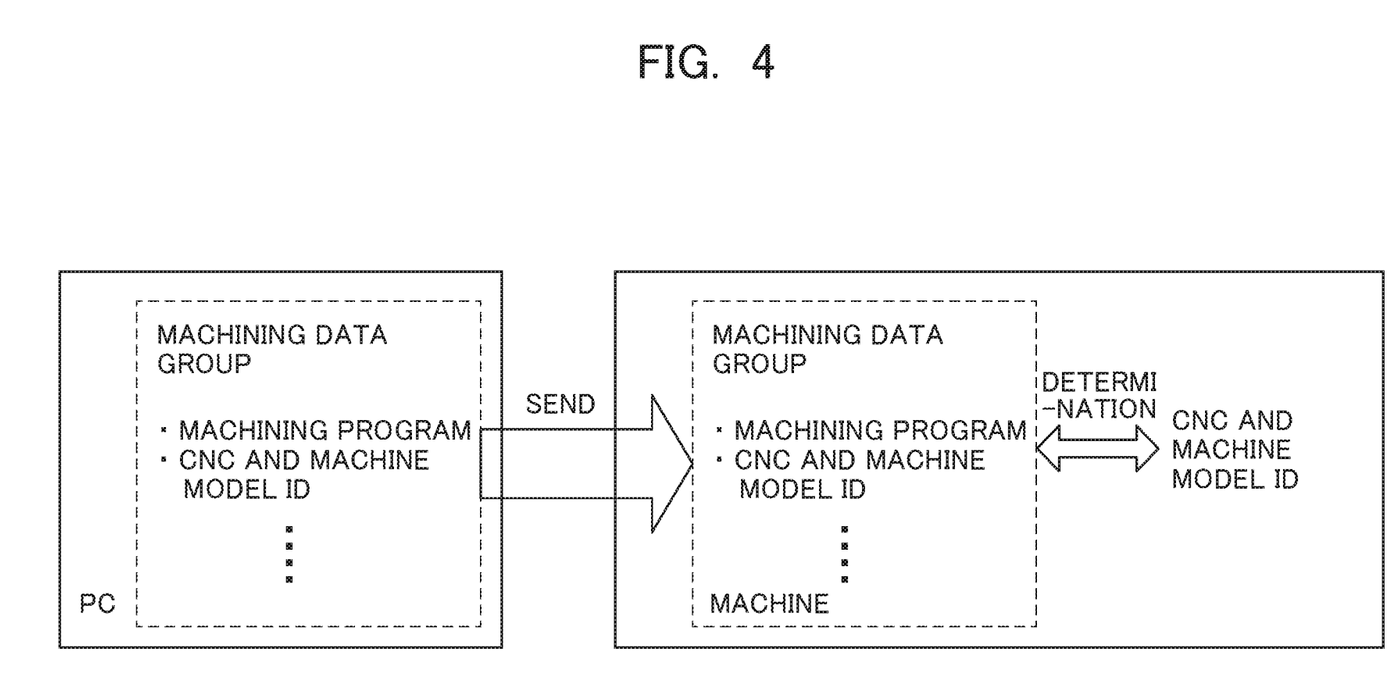
FIG. 4 is a diagram used to explain a control method by a numerical control system and a program simulation system for industrial machines according to an aspect.
Figure 5:
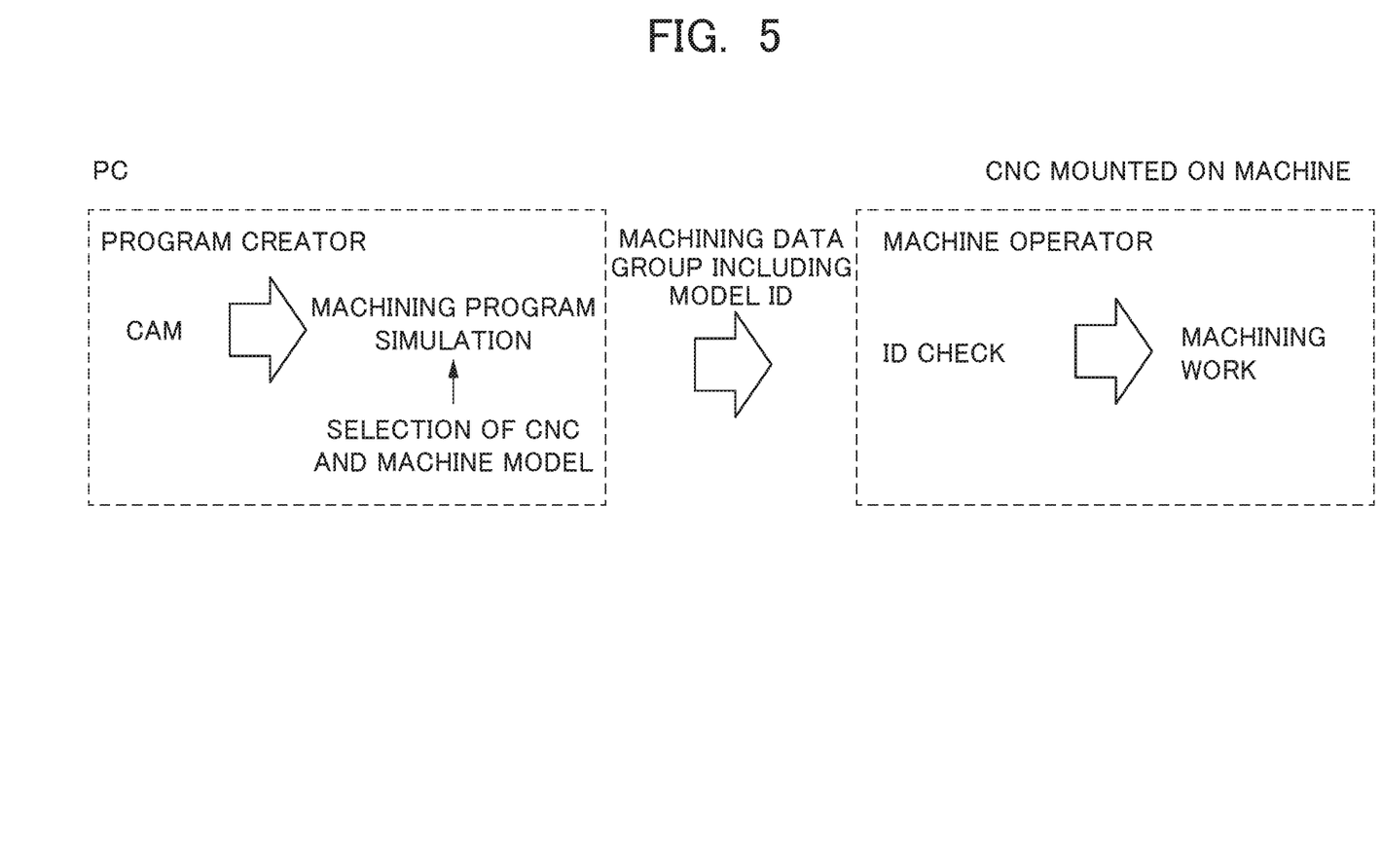
FIG. 5 is a diagram used to explain a control method by a numerical control system and a program simulation system for industrial machines according to an aspect.

A numerical control system 1 of the present embodiment includes a CAD 2 for performing the design, drawing, and the like of a product; a CAM 5 including a machining program creation unit (program creation unit) 3 that creates a machining program (program) from a machining shape data created by the CAD 2 and a machining simulator unit (simulator unit) 4 that performs a machining simulation; a CNC 6 being a command unit that sends a command signal based on a machining plan information (G-code, operation plan information, etc.) sent from the CAM 5; and a motor control unit (not shown) that controls the drive of a servo motor (drive unit (not shown)) of a machine tool based on a command of the CNC 6.

The servo motor being the driving unit is, for example, a servo motor for driving a feed shaft for moving a table that holds a workpiece, a main shaft to which a tool and the like are mounted, and the like. The motor control unit is, for example, a servo amplifier or the like.

In the present embodiment, for example, the CNC 6 being a numerical controller is provided to be mounted on the machine tool being an industrial machine. In the present embodiment, a plurality of machine tools is provided in the system of the numerical control system 1, and one numerical control system 1 controls the operation of the plurality of machine tools. Of course, it does not necessarily have to be configured to control a plurality of machine tools.

On the other hand, the numerical control system 1 includes a program simulation system 10 for simulating the operation of a machine tool using a machining program created by a program creator.

The program simulation system 10 of the present embodiment includes a machining program creation unit 3; a machining simulator unit 4 that performs a machining simulation; a CNC/machine model storage unit 7 that stores a CNC model or a machine model; a CNC/machine model selection unit (machine selection unit) 8 that selects a CNC model or a machine model stored in the CNC/machine model storage unit 7; a simulation determination unit 9 that determines whether the simulation performed by the machining simulator unit 4 is good; and an identification data group creation unit 11 that adds identification information (identification code such as ID) to data such as a machining program to create a data group when the simulation is determined to be good by the simulation determination unit 9.

In the present embodiment, the machining program creation unit 3, the machining simulator unit 4, the CNC/machine model storage unit 7, the CNC/machine model selection unit 8, the simulation determination unit 9, and the identification data group creation unit 11 are provided on the side of a PC (personal computer) 12 operated by a program creator.

The program simulation system 10 of the present embodiment is provided on the side of the machine tool on which the CNC 6 is mounted, and includes a CNC/machine model identification information storage unit 13 that stores the identification information (identification code) of the CNC model or machine model of the machine itself; a data group management/determination unit (determination unit) 14 that compares data group created and sent by the identification data group creation unit 11 to information (code) stored by the CNC/machine model identification information storage unit 13 to determine whether the data group is good; a warning unit 15 that issues a warning when the determination result of the data group management/determination unit 14 is not good; and an execution unit 16 that outputs an operation command for the machine tool based on information such as a machining program received from the CAM 5 when the determination result of the data group management/determination unit 14 is good.

In the present embodiment, the CNC/machine model identification information storage unit 13, the data group management/determination unit 14, the warning unit 15, and the execution unit 16 are provided in the CNC 6 on the side of the machine operated by a machine operator.

In the program simulation system 10 and the numerical control system 1 of the present embodiment thus configured, as shown in FIG. 1 and FIGS. 2 to 4, the CNC/machine model selection unit 8 on the PC side selects at least one machine tool to be simulated from among a plurality of machine tools. The simulator unit 4 simulates the program for the selected machine tool, and the simulation determination unit 9 determines whether the simulation result and thus the machining program are good.

After the simulation determination unit 9 determines that the program is appropriate, the identification data group creation unit 11 automatically adds an identification code such as ID for specifying a machine tool to the program, and creates a data group of the program and the identification code.

Then, the data group created by the identification data group creation unit 11 is sent to the data group management/determination unit 14 on the machine side. The data group management/determination unit 14 checks the identification code in the data group against the identification code of the machine tool itself stored in the CNC/machine model identification information storage unit 13, and determines whether the identification codes match each other.

In the present embodiment, the identification code includes, for example, at least one of the manufacturer name of an industrial machine, an identification code for identifying an industrial machine, or a version identification code for identifying the version of an industrial machine.

In the program simulation system 10 and the numerical control system 1 of the present embodiment, control is performed such that the execution unit 16 permits execution of operation when the determination result of the data group management/determination unit 14 is a match, the execution unit 16 prohibits execution of operation when the determination result is a mismatch, and the warning unit 15 issues a warning when the determination result is a mismatch only in respect of the version of the machine tool.

More specifically, in the program simulation system 10 and the numerical control system 1 of the present embodiment, the program creator first uses a CNC and machine model and verifies a machining program on the simulator unit 4 on the PC side, i.e., on a simulation software.

After the verification is completed, the simulation software registers a used model ID in a machining data group.

For example, when a plurality of CNC and machine models is used with respect to one machining program in the case where a machining program can be easily diverted or where the version of the CNC and machine is different, a plurality of model IDs can be registered in one machining data group.

On the machine side, if the model ID information included in the machining data group differs from the model ID information stored in the machine in advance, the CNC outputs an error and prohibits execution of the program.

If the model is the same and the version of the CNC or machine is different, the warning "different version" is simply displayed and execution of the machining program is not prohibited.

This eliminates the need to contact the program creator to register the model ID.

Here, the content of the machine model is generally set by the machine tool manufacturer because it includes the configuration and physical information of the machine. In addition, the CNC 6 is selected by the machine tool manufacturer.

For example, in general, the machine model and the CNC model can be combined into one ID, and the match/mismatch can be determined by configuring with a combination of the information of the machine manufacturer name ID, machine name ID, and machine version ID.

If the machine manufacturer names and the machine names (models) match and the machine versions do not match at the time of determination, a warning is outputted instead of an error, and the machine operator can select whether to execute the machining program. This assumes, for example, a case where the operation in the machining area does not change even if the machine versions are different due to a difference in the operation screen or the tool changing device.

Therefore, in the program simulation system 10 and the numerical control system 1 for industrial machines of the present embodiment having the above-mentioned configuration, the program creator manages the ID information (identification code, identification information) of the CNC and machine model used in the machining simulation and the machining program as a set (machining data group), and determines whether the correct ID is used by comparing the ID information of the CNC and machine model used in the machining simulation to the model ID set on the machine side by the machine tool manufacturer prior to executing the program.

In the program simulation system 10 for industrial machines and the numerical control system 1 of the present embodiment, if the machining data group sent to the machine operator is inputted to the CNC 6, the CNC 6 can automatically determine whether the model ID of the machining data group matches.

Thus, according to the program simulation system 10 for industrial machines and the numerical control system 1 of the present embodiment, it is possible to prevent human error that a machine operator executes a program verified with a wrong model on a machine.

Re-simulation by a machine operator which is conventionally required can be made unnecessary, and the work burden of the machine operator can be mitigated.

It is not necessary to provide a simulation function on the machine side, and it is possible to reduce costs.

It should be noted that the data group must include at least a program and a model ID (identification code, identification information), but it may include other data related to the program.

An embodiment of the program simulation system for industrial machines and the numerical control system has been described above, but the present invention is not limited to the above-described embodiment, and the present invention can be modified as appropriate without departing from the spirit of the present invention.

EXPLANATION OF REFERENCE NUMERALS 1 numerical control system
2 CAD
3 machining program creation unit (program creation unit)
4 machining simulator unit (simulator unit)
5 CAM
6 CNC
7 CNC/machine model storage unit
8 CNC/machine model selection unit (machine selection unit)
9 simulation determination unit
10 program simulation system
11 identification data group creation unit
12 PC

What is claimed is:

1. A program simulation system for industrial machines that performs a simulation according to a program, the system comprising:
   a machine selection unit that selects at least one industrial machine to be simulated via the program;
   an identification data group creation unit that has a function to automatically add an identification code for specifying the industrial machine to the program after simulating the program for the industrial machine selected by the machine selection unit and create a data group of the program and the identification code; and
   a determination unit that determines whether the identification code in the data group sent to an industrial machine side matches an identification code of the industrial machine itself.

2. A numerical control system, comprising:
   the program simulation system according to claim 1; and
   an industrial machine equipped with a numerical controller,
   wherein operation of the industrial machine is controlled according to a determination result of the determination unit.

3. The numerical control system according to claim 2, wherein the identification code includes at least one of a manufacturer name of the industrial machine, an identification code for identifying the industrial machine, or a version identification code for identifying a version of the industrial machine.

4. The numerical control system according to claim 2,
   wherein the industrial machine is controlled so as to permit execution of the operation when the determination result of the determination unit is a match,
   to prohibit the execution of the operation when the determination result of the determination unit is a mismatch, and
   to issue a warning when the determination result of the determination unit is a mismatch in respect of only a version of the industrial machine.

5. The numerical control system according to claim 3,
   wherein the industrial machine is controlled so as to permit execution of the operation when the determination result of the determination unit is a match,
   to prohibit the execution of the operation when the determination result of the determination unit is a mismatch, and
   to issue a warning when the determination result of the determination unit is a mismatch in respect of only the version of the industrial machine.

* * * * *